United States Patent [19]
Uchide

[11] Patent Number: 6,064,795
[45] Date of Patent: May 16, 2000

[54] METHOD OF AND APPARATUS FOR DATA RECORDING, METHOD OF AND APPARATUS FOR DATA REPRODUCTION, RECORDING MEDIUM, AND METHOD OF AND APPARATUS FOR DATA TRANSMISSION

[75] Inventor: Kouichi Uchide, Kanagawa, Japan

[73] Assignee: Sony Corporation, Tokyo, Japan

[21] Appl. No.: 09/067,989

[22] Filed: Apr. 29, 1998

Related U.S. Application Data

[62] Division of application No. 08/628,507, Apr. 5, 1996.

[30] Foreign Application Priority Data

Apr. 8, 1995 [JP] Japan .................................. 7-107975
Apr. 8, 1995 [JP] Japan .................................. 7-107976

[51] Int. Cl.⁷ ...................................................... H04N 5/92
[52] U.S. Cl. ............................ 386/112; 386/111; 348/390
[58] Field of Search ..................................... 386/111, 112, 386/109, 125, 126; 369/48; 348/13, 384, 390; H04N 5/92

[56] References Cited

U.S. PATENT DOCUMENTS 5,432,769  7/1995  Honjo ............................................ 369/48
5,608,697  3/1997  De Haan et al. ............................ 369/48

*Primary Examiner*—Huy Nguyen
*Attorney, Agent, or Firm*—Frommer Lawrence & Haug, LLP.; William S. Frommer

[57] ABSTRACT

A method and an apparatus for recording, and reproducing data in which compression-coded moving picture signals can be continuously reproduced irrespective of the amount of information generated. When recording data obtained by compression-coding a moving picture signal of a fixed period of time on a recording medium, only writing to an FIFO buffer memory is effected and reading to the recording medium is inhibited for a fixed period of time from the output start of the data and, after the fixed period of time has elapsed, the writing of the compression-coded data to the FIFO buffer memory is continued and, at the same time, the data written to the FIFO buffer memory is read out at a data rate which is not lower than the data rate for the writing to packetize the data, the data thus packetized being recorded on the recording medium.

8 Claims, 9 Drawing Sheets

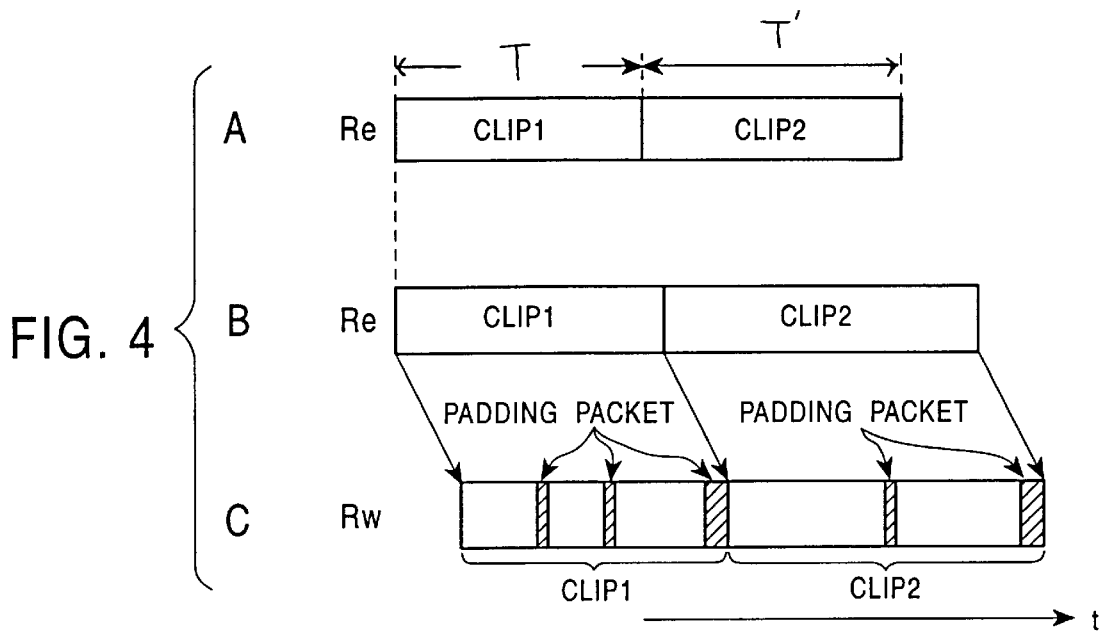
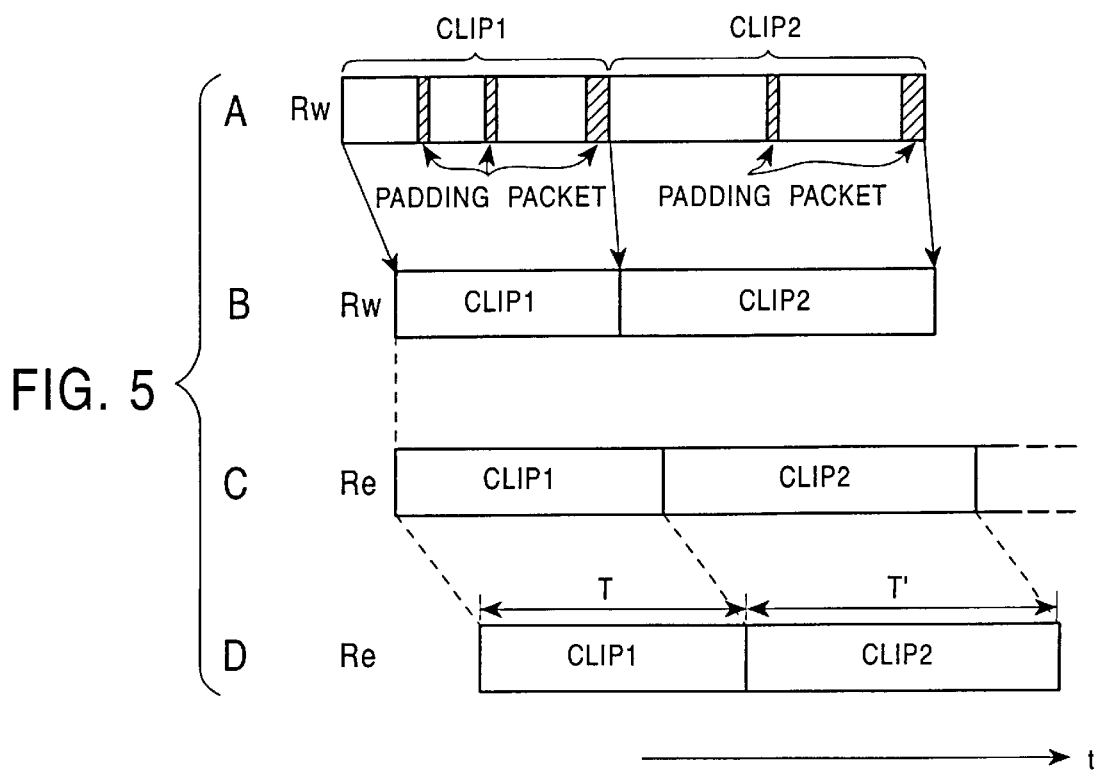

METHOD OF AND APPARATUS FOR DATA RECORDING, METHOD OF AND APPARATUS FOR DATA REPRODUCTION, RECORDING MEDIUM, AND METHOD OF AND APPARATUS FOR DATA TRANSMISSION

This is a divisional of application Ser. No. 08/628,507, filed Apr. 5, 1996.

BACKGROUND OF THE INVENTION

1. Field of the Invention

The present invention relates to a data recording apparatus, a data reproducing apparatus, etc. in which moving picture signals are compression-coded for recording or reproduction.

The present invention further relates to a data transmission apparatus in which moving picture signals are compression-coded for transmission to remote sites.

2. Description of the Related Art

Generally speaking, in systems for recording and reproducing digital moving picture signals and systems for transmitting them to remote sites, an image signal compression-coding method is adopted in order to efficiently utilize the capacity of the recording medium, the transmission line, etc. In such a method, it is general practice to perform the compression coding of moving picture signals by utilizing in-frame correlation or inter-frame correlation. Examples of the compression coding formats include MPEG1 and MPEG2. Further, coding methods in conformity with the H. 261 recommendation, etc. are available.

In compression coding apparatuses, etc. operating in accordance with such coding formats, coding is to be effected such that the amount of moving picture signal data generated during a fixed period of time is kept constant.

However, the amount of data generated by compression coding is usually not constant. Further, the amount of data thus generated differs from frame to frame.

If the amount of data generated per unit time is not constant, it is very difficult to directly record the generated data on a recording medium or directly transmit it.

This is generally due to the fact that the data recording rate or the data transmission rate is constant.

In view of this, a buffer memory is usually provided between the moving picture image compression coding section and the medium recording section or between the moving picture image compression coding section and the transmission section so that the data rate of the variable amount of coded data output to the recording apparatus, the transmission line, etc. may be kept constant. In the moving picture image compression coding section, the amount of coded data generated is adjusted such that the buffer memory will not suffer failure.

Thus, the average rate of data amount generated per unit time in the moving picture image compression coding section when performing moving picture image compression coding is the same as the data rate of the coded data output from the buffer memory.

The device for performing these operations is generally called an encoder, which includes the buffer memory.

In the device for decoding the compression-coded data to the original moving picture signals, a buffer memory similar to the one mentioned above is provided between the recording apparatus or the output end of the transmission line and the expansion decoding section. The device for performing these operations is generally called a decoder, which includes the buffer memory.

In this way, in the conventional encoder and decoder, compression coding processing is effected so that the amount of moving picture signal data per unit time may approach a constant value or it may approach a target generation amount of coded data.

Here, a case will be considered in which coded data obtained by compression-coding a moving picture signal of a time length T is recorded on a recording medium at a writing rate R, the recorded data then being read out at reading rate R and decoded to thereby reproduce the moving picture signal. In this case, the target generation amount of coded data Ei is given by the following equation:

$$Ei = R \times T \qquad (1)$$

However, as shown by the following inequality, the actual amount of data generated Er is not the constant value R×T but varies as follows:

$$R \times T - B \leq Er \leq R \times T + B \qquad (2)$$

where B represents the capacity of the buffer memory provided in the encoder. That is, it is possible for the amount of coded data Er to vary by the capacity B of the buffer memory in the encoder.

Assuming that this data is recorded on the recording medium as it is and then read out, the reading time t is as shown by the following inequality:

$$T - \frac{B}{R} \leq t \leq T + \frac{B}{R} \qquad (3)$$

The reproduction time for the moving picture signal which is obtained by decoding the data read out is also T. This shows that image reproduction time and the requisite time for reading out the data is not the same.

When, as in the case of an AV server, an arbitrary number of items of data obtained by compression-coding moving picture signals of a fixed period of time (they will be hereinafter referred to as "clips") are written to a medium, and an arbitrary number of clips are read out from the medium to continuously reproduce the image signals, the following problem is involved:

When an arbitrary number of clips obtained by compression-coding moving picture signals of a fixed period of time are written to a medium and an arbitrary number of clip image signals are continuously reproduced therefrom, the requisite time for reading out data differs for each item of data, so that, when the time for reading out data is longer than the time for reproduction, it is impossible to continuously reproduce the actual clip image signals without interruption.

SUMMARY OF THE INVENTION

It is an object of the present invention to provide a method of and apparatus for data recording, a method of and apparatus for data reproduction, a recording medium, and a method of and apparatus for data transmission which enable a clip image of an arbitrary length of time to be reproduced without interruption.

To achieve the above object, in accordance with the present invention, when recording compression-coded moving picture signals of a fixed period of time or outputting them to the transmission line, the compression-coded data is only written to an FIFO buffer memory for a period of time from the output start of the compression-coded data, and the reading thereof to the recording medium or to the transmission line is inhibited.

When a fixed period of time has elapsed from the output start of the compression-coded data, the compression-coded data is written to the FIFO buffer memory, and, at the same time, the compression-coded data which has been written to the FIFO buffer memory is read out at a data rate exceeding that at the time of data writing and packetized. This packetized data is recorded on the recording medium, or output to the transmission line.

When packet data is read from a recording medium on which compression-coded data, obtained by compression-coding moving picture signals of a fixed period of time, is recorded after being converted to packet data whose size is constant independently of the amount of data generated, or when it is received from a transmission line, the packet data is read at a data rate not lower than the rate at which it was written to the recording medium or the rate at which it was output to the transmission line and is then written to an FIFO buffer memory. After that, the written compression-coded data is read from the FIFO buffer memory at a rate that is the same at which it was compression-coded and is then decoded.

Generally speaking, when compression-coding a moving picture signal, the amount of data generated fluctuates. However, regardless of this fluctuation, the compression-coded data when it is recorded on a recording medium or output to a transmission line is converted to packet data of a fixed size. Thus, it is possible for the moving picture signal to be recorded or transmitted within a fixed period of time regardless of the amount of data generated.

Further, it is possible for the moving picture signal to be reproduced or received, whether on the reproduction or reception side, within a fixed period of time regardless of the amount of data generated.

BRIEF DESCRIPTION OF THE DRAWINGS

FIG. 4 is a schematic diagram showing the relationship between data generation amount and processing time in recording;

FIG. 5 is a schematic diagram showing the relationship between data generation amount and processing time in reproduction;

DETAILED DESCRIPTION OF THE PREFERRED EMBODIMENTS OF THE INVENTION (1) The Principle On Which Recording And Reproduction Are Performed To write an arbitrary number of items of data obtained by compression-coding a moving picture image of a fixed period time, that is, an arbitrary number of clips, to a recording medium and to continuously reproduce an arbitrary number of image signals from this recording medium without interruption, the recording apparatus of this embodiment adopts an arrangement in which, after writing compression-coded data to an FIFO buffer memory for a fixed period of time, the data is read out at a data rate higher than the rate of writing to record packetized data on the recording medium.

Further, in the reproducing apparatus of this embodiment, data is extracted from a packet read from a recording medium at a rate that is the same or higher than the recording rate, and this data is written to an FIFO buffer memory having a capacity not smaller than that for the recording. Then, the data is read out at a rate that is the same as the coding rate to effect expansion decoding.

Figure 1:
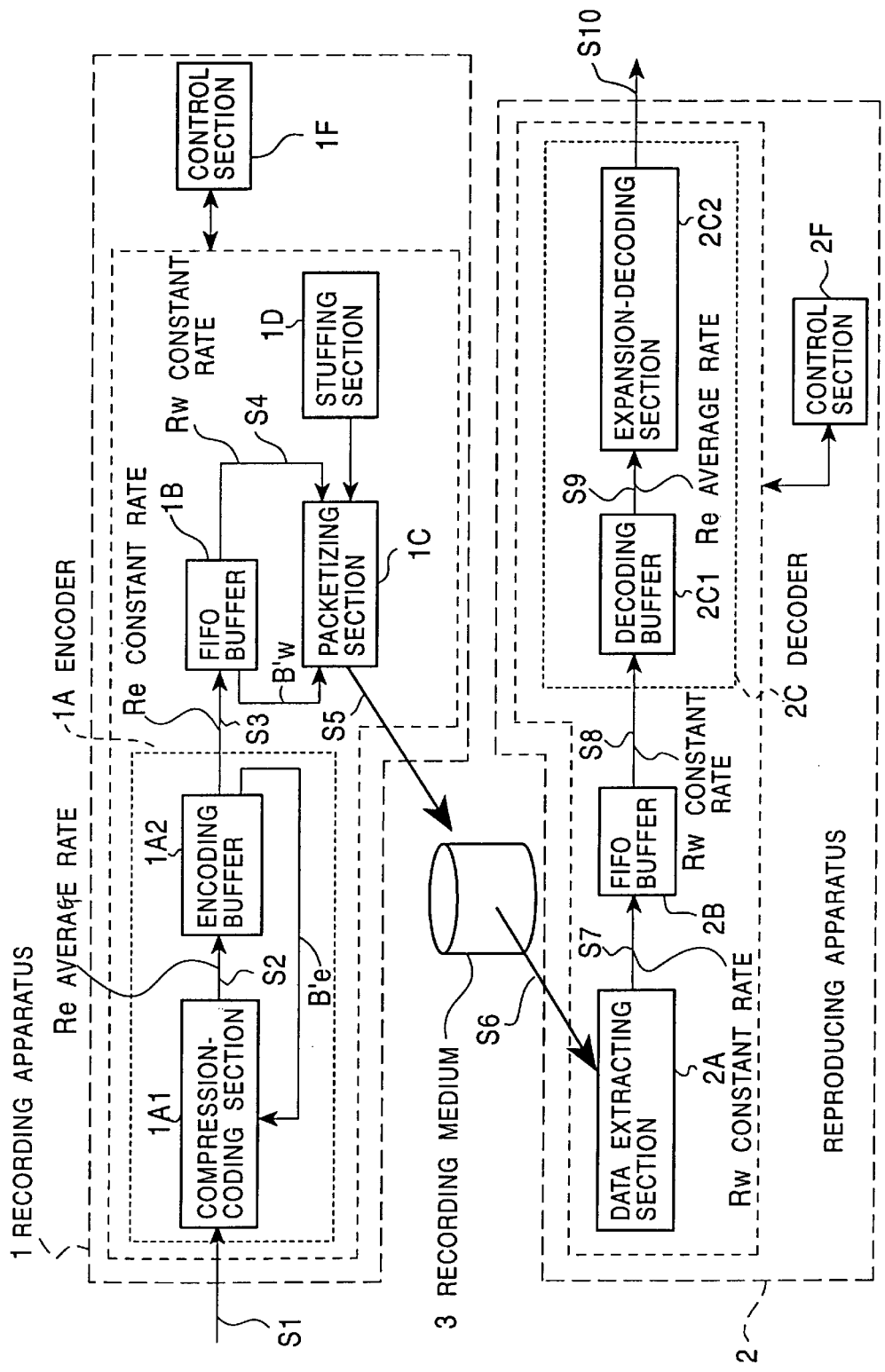
FIG. 1 is a block diagram showing the basic construction of a data recording apparatus and of a data reproducing apparatus according to the present invention.

(2) Basic System Configuration (2-1) Construction of Recording Apparatus And Reproducing Apparatus FIG. 1 shows a hardware construction example of a recording apparatus 1 for executing this recording method and a reproducing apparatus 2 for executing this reading method.

First, the construction of the recording apparatus 1 will be described. The recording apparatus 1 is composed of an encoder 1A, an FIFO buffer memory 1B, a packetizing section 1C and a stuffing section 1D.

The encoder 1A is composed of a compression coding section 1A1 and an encoding buffer memory 1A2. The compression coding section 1A1 effects variable-amount compression coding of a moving picture signal S1 at an average rate of Re, and successively outputs coded data S2 to the encoding buffer memory 1A2 having a capacity Be.

Further, when a fixed amount of coded data S2 has been accumulated in the memory, the encoding buffer memory 1A2 outputs coded data S3 (S2) at the rate Re. Data indicating the buffer remainder Be' of the encoding buffer memory 1A2 is fed back to the compression coding section 1A1 and the processing of the compression coding section 1A1 is controlled so that the buffer may not suffer failure.

The FIFO buffer memory 1B is a buffer memory with a capacity Bw provided for data rate conversion. The FIFO buffer memory 1B accumulates the coded data S3 written at the rate Re for a predetermined period of time Tw. After that, it outputs the data to the packetizing section 1C at a reading rate Rw higher than the writing rate Re. Here, the accumulation time Tw, the reading rate Rw and the buffer capacity Bw are set as follows:

$$Tw \geq (Re \times T + Be)/Re - T = Be/Re \quad (4)$$

$$Rw \geq (Re \times T + Be)/T = Re + Be/T \quad (5)$$

$$Bw \geq Tw \times Re \quad (6)$$

In the packetizing section 1C, coded data S4 time-compressed by the FIFO buffer memory 1B is successively input and stored in one or a plurality packets before being output. In this process, the packetizing section 1C writes the requisite information, such as the packet size, the kind of data, and time information, to a packet header, and records it on a recording medium 3 at the fixed rate Rw. Strictly speaking, the rate at which the recording on the recording medium is effected must be somewhat higher than Rw because of the increase in data amount due to the packet header. However, this is negligible since it is a small amount as compared with the coded data.

As a result, packet data S5 can be written without fail to the recording medium 3 within a period of time corresponding to the clip reproduction time T regardless of the amount of information generated.

Due to the relation ship: Rw>Re, when the FIFO buffer memory 1B runs out of data during the packet processing, the packetizing section 1C inserts meaningless data that is not directly related to the data supplied from the stuffing section 1D (i.e., stuffing data) in the packet for the purpose of filling, whereby failure in data transmission form is prevented. The encoder 1A, the packetizing section 1C, the FIFO buffer 1B and the stuffing section 1D are controlled by a control section 1F.

Next, the construction of the reproducing apparatus 2 will be described. The reproducing apparatus 2 is composed of a data extracting section 2A, an FIFO buffer memory 2B and a decoder 2C.

The reproducing apparatus 2 reads out recording data recorded on the recording medium 3 at a fixed rate Rw, and reads it in the data extracting section 2A as reproduction data S6.

The data extracting section 2A extracts coded data S7 corresponding to the moving picture signal from the packet on the basis of header information, etc., and transmits it to the FIFO buffer memory 2B for reading out. In this process, when stuffing data is extracted from the packet, the data extracting section 2A scraps it so that it may not be decoded.

Assuming that the reading rate at which the data extracting section 2A reads the recording data S6 from the recording medium 3 is the same as the writing rate, i.e., Rw, the requisite time for reading Td can always be kept within the clip display time as shown by the following formula:

$$Td=(Re \times T+Be)/Rw \geq T \quad (7)$$

In this way, the coded data S7 extracted by the data extracting section 2A is written to the FIFO buffer memory 2B for reading, and the data rate is restored to the original value. The capacity Br of the FIFO buffer memory 2B satisfies the following condition:

Generally speaking, the capacity of the decoding buffer memory 2C1 contained in the decoder 2C is not smaller than that of the encoding buffer memory 1A2, so that, in this embodiment, the capacity Br of the FIFO buffer memory 2B is the same or larger than the capacity Bw of the FIFO buffer memory 1B for writing, as shown by the following inequality:

$$Br \geq Bw \quad (8)$$

Finally, the decoder 2C will be described. The decoder 2C is composed of a decoding buffer memory 2C1 and an expansion decoding section 2C2.

The decoding buffer memory 2C1 reads coded data S8 from an FIFO buffer memory 2B at a fixed rate Re and supplies it to the expansion decoding section 2C2. The expansion decoding section 2C2 decodes the coded data S8 at the average decoding rate Re, and outputs the decoding result as a moving picture signal S10.

The extracting section 2A, the FIFO buffer 2B and the decoder 2C are controlled by a control section 2F.

(2—2) Procedures For Recording And Reproduction

Recording and reproducing operations executed in the recording apparatus 1 and the reproducing apparatus 2 of the above construction at the time of recording and reproduction will be described one by one.

Figure 2:
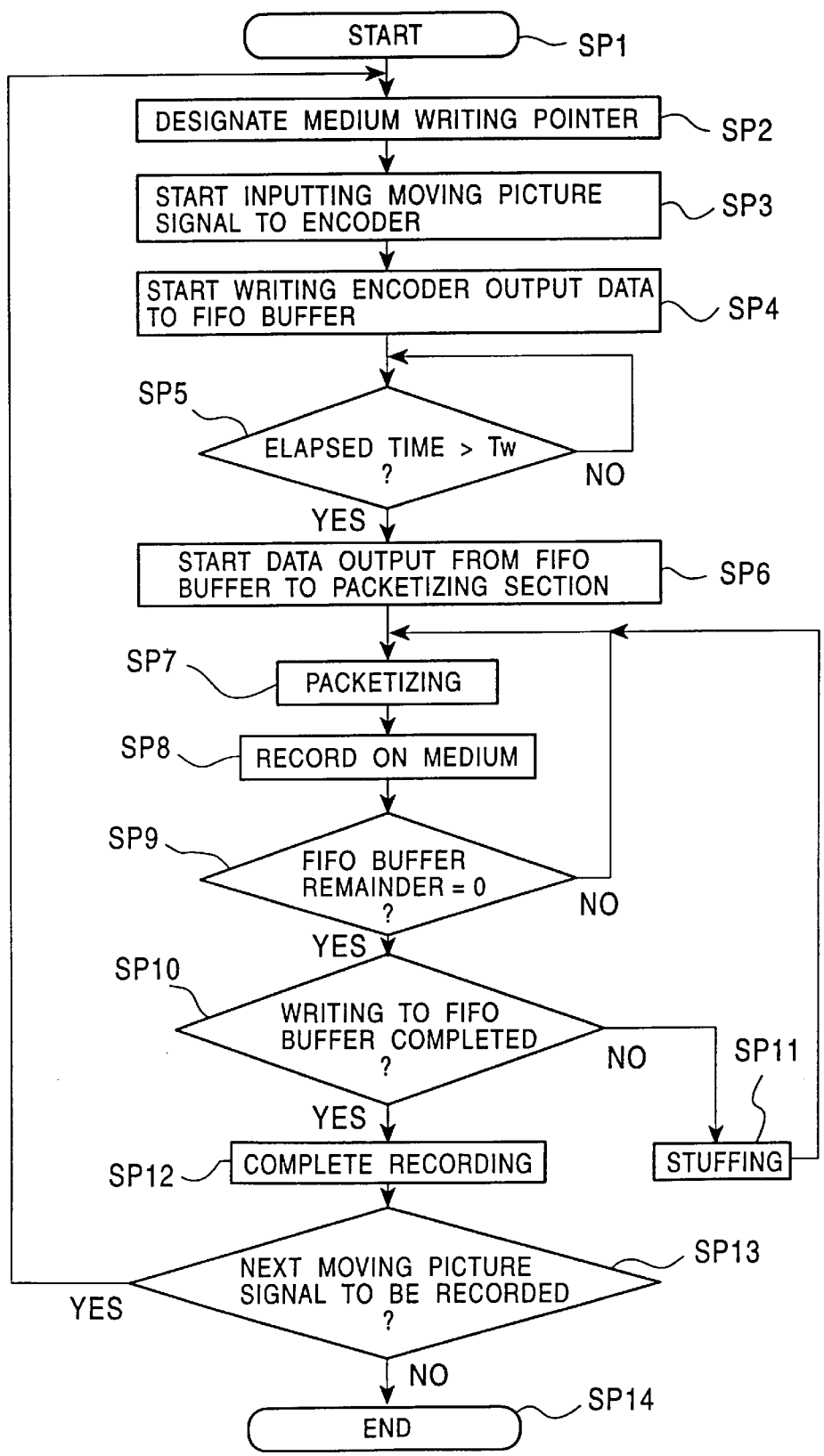
FIG. 2 is a flowchart illustrating a recording operation by the data recording apparatus.

First, the recording operation when a plurality of clips are to be continuously reproduced without interruption, that is, the control operation of the control section 1F, will be described with reference to FIG. 2.

When the recording operation is started, the procedure for the recording apparatus 1 advances from step SP 1 to step SP 2, and designates the position for the recording of the moving picture signal on the recording medium 3 by means of a pointer. This pointer is used as the reading pointer for reading out the recording data of the moving picture signal at the time of reproduction.

When the designation with the writing pointer has been completed, the procedure for the recording apparatus 1 advances to step SP 3, in which the moving picture signal S1 is input to the encoder 1A, and variable amount encoding is started.

When the encoding is started, the recording apparatus 1 encodes the moving picture signal S1 by the encoder 1A at the average rate Re and, as shown in step SP 4, writes the coded data S3 obtained by the encoding from the encoding buffer memory 1A2 to the FIFO buffer memory 1B.

As shown in the next step SP 5, the recording apparatus 1 checks the period of time elapsed from the writing start time and makes a judgment as to whether the period of time elapsed is larger than the accumulation time Tw as given by formula (4).

When the result of the judgment is in the affirmative, the reading of the coded data S4 from the FIFO buffer memory 1B to the packetizing section 1C is started in the recording apparatus 1, as shown in step SP 6. The data rate Rw in this reading is, as described above, a value larger than the data rate Re when the data is written to the FIFO buffer memory 1B.

After this, as shown in steps SP 7 through SP 9, the recording apparatus 1 packetizes the coded data S4 in the packetizing section 1C and records it on the recording medium 3 as packet data S5 until it is made certain that the buffer remainder B'w of the FIFO buffer memory has become empty. Where the result of step SP 9 is in the affirmative and it is made sure that the FIFO buffer memory 1B has become empty, the procedure for the recording apparatus 1 advances to step SP 10, in which a judgment is made as to whether the writing to the FIFO buffer memory 1B by the encoder 1A has been completed.

When the result of the judgment is in the negative, it is determined that the FIFO buffer memory 1B has become temporarily empty due to the fact that the rate Rw at which reading from the FIFO buffer memory is effected is higher than the writing rate Re and, in steps SP11-SP7-SP8-SP9, operation is effected such that the shortage in packet data is compensated for by filling with stuffing data. This processing routine is continued until the reading from the FIFO buffer memory 1B is started again.

When the reading from the FIFO buffer memory 1B is started again, the processing routines of steps SP9-SP7-SP8-SP9 are repeatedly executed.

When the result obtained in steps SP 9 and SP 10 is in the affirmative, the completion of the recording of a series of moving picture signals S1 is confirmed in step SP 12, and in the next step SP 13, a judgment is made as to whether the moving picture signal S1 of the next clip is to be recorded or not.

As long as the result of the judgment is in the affirmative, the recording apparatus 1 repeatedly executes the procedures of steps SP 2 through SP 13. When the result obtained is in the negative, the recording of a plurality of clips is completed.

Figure 3:
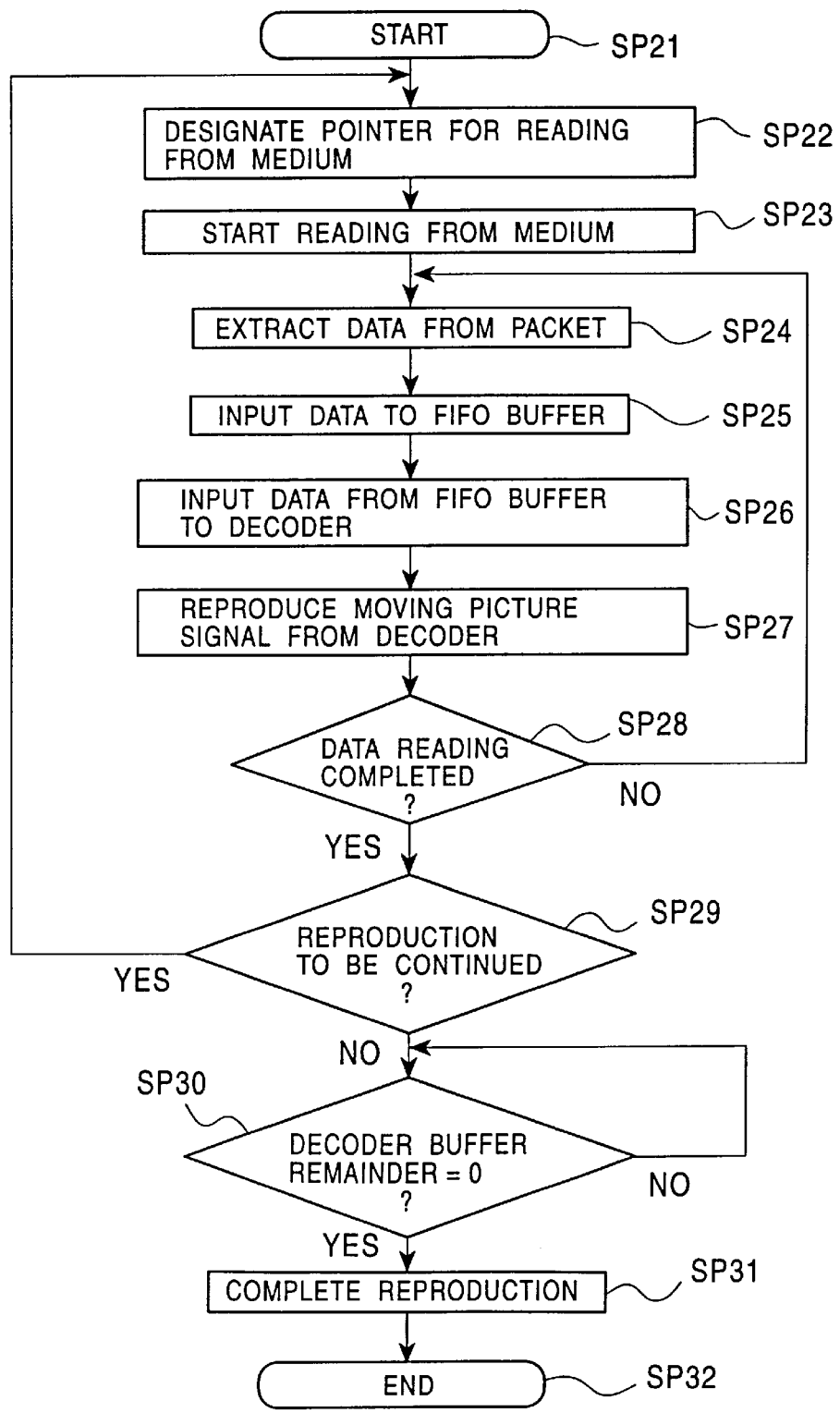
FIG. 3 is a flowchart illustrating a reproducing operation by the data reproducing apparatus.

Next, the reproducing operation effected when reproducing the thus recorded recording data from the recording medium 3, that is, the control operation of the control section 25, will be described with reference to FIG. 3.

When the reproducing operation is started, the procedure for the reproducing apparatus 2 advances from step SP 21 to step SP 22 and the position on the recording medium 3 for the reading of the recording data is designated with the reading pointer.

When the designation with the reading pointer has been completed, the reading of data from the recording medium 3 is started as shown in step SP 23.

When reproduction data S6 has been read to the data extracting section 2A, the reproducing apparatus 2 extracts, as shown in step SP 24, stuffing data from the reproduction data S6 read out at the fixed rate Rw, and, in step SP 25, operates such that only the portion of the coded data S7 corresponding to the moving picture signal is supplied to the FIFO buffer memory 2B.

In the next step SP 26, the reproducing apparatus 2 supplies coded data S8 rate-converted by the FIFO buffer memory 2B to the decoder 2C, and the reproduction of the moving picture signal S10 is started again by the decoder 2C.

Then, in the next step SP 28, the reproducing apparatus 2 makes a judgment as to whether the data reading has been entirely completed or not. As long as the result of the judgment is in the negative, the procedures of the steps: SP29-SP24-SP25-SP26-SP27-SP28 are repeated.

When data reading corresponding to one clip has been completed by repeating this processing loop, the procedure for the reproducing apparatus 2 advances from step SP 28 to SP 29, and a judgment is made as to whether there is a next clip to be continuously reproduced.

As long as the result of the judgment is in the affirmative, the reproducing apparatus 2 repeats the procedures of steps SP 22 through SP 28. When the result of the judgment obtained is in the negative, the procedure advances to step SP 30.

When, in step SP 30, it is made sure that the buffer remainder of the decoding buffer memory 2C1 has been reduced to zero, the procedure advances to step SP 31, in which the reproducing operation is completed.

FIGS. 4 and 5 show the relationship between data amount and processing time in an example of recording/reproducing operation in which two clips, clip 1 and clip 2, are continuously recorded.

It will be assumed that the image periods of the clip 1 and clip 2, which are to be recorded continuously, are T and T', as shown in FIG. 4(A). Generally speaking, it is possible for the amount of coded data generated in the encoder 1A to fluctuate by an amount corresponding to the capacity Be of the encoding buffer memory 1A2 of the encoder 1A. For example, assuming that the amount of coded data is large, it takes $T+\Delta T$ and $T'+\Delta T'$ to read the coded data S3 of clip 1 and clip 2 from the FIFO buffer memory 1B, as shown in FIG. 4(B).

If this coded data S3 were recorded as it is on the recording medium 3 as in the prior art, it would take $T+\Delta T$ and $T'+\Delta T'$ to reproduce clip 1 and clip 2 from the recording medium 3, which would be longer than the display time. Thus, in conventional reproducing apparatus, there is a fear of a blank time AT being generated if two clips, clip 1 and clip 2, are continuously reproduced.

In the recording apparatus 1 of this embodiment, in contrast, data is read from the FIFO buffer memory 1B at a data rate higher than the average encoding rate Re and in a condition satisfying formula (5), so that the data portions including clip 1 and clip 2 can be completely written to the recording medium 3 within the image periods T and T' regardless of the buffer remainder Be'. This is shown in FIG. 4(C). The shaded portions in the drawing represent the stuffing data filling periods.

At the time of completion of the recording on the recording medium, data is recorded on the recording medium 3 in a data construction as shown in FIG. 4(C).

In reproduction, the reproducing apparatus 2 can read the recording data of the moving picture signals corresponding to clip 1 and clip 2 within the periods T and T', respectively, as shown in FIG. 5(A).

Furthermore, stuffing data is extracted from the reproduction data S6 read out, so that, as shown in FIG. 5(B), only the data really corresponding to the moving picture signals are read to the FIFO buffer memory 2B.

After this, coded data S8 is read out, as shown in FIG. 5(C), from the FIFO buffer memory 2B to the decoder 2C at the original data rate Re and decoded. At this time, in FIG. 5(C), the apparent data reading periods are longer than the display periods of clip 1 and clip 2 by an amount corresponding to the buffer remainder. However, since the decoding operation for each item of coded data is completed in periods T and T', respectively, it is possible to continuously reproduce two clips, clip 1 and clip 2, as shown in FIG. 5(D).

In the above-described construction, it is possible to read moving picture signals of two clips to be continuously reproduced from the recording medium 3 within the respective display periods T and T', whereby delay in clip display due to delay in decoding operation can be avoided. This makes it possible to realize a recording apparatus 1 and a reproducing apparatus 2 which can continuously reproduce a plurality of clips without involving any blank periods. Further, it is also possible to realize a recording medium which allows continuous reproduction.

(3) Another Embodiment (3-1) Construction of Recording Apparatus And Reproducing Apparatus In a recording apparatus according to another embodiment, packetized data is written to an FIFO buffer memory for a fixed period of time after the compression coding, and then read out at a data rate not lower than the writing data rate and recorded on a recording medium.

Figure 6:
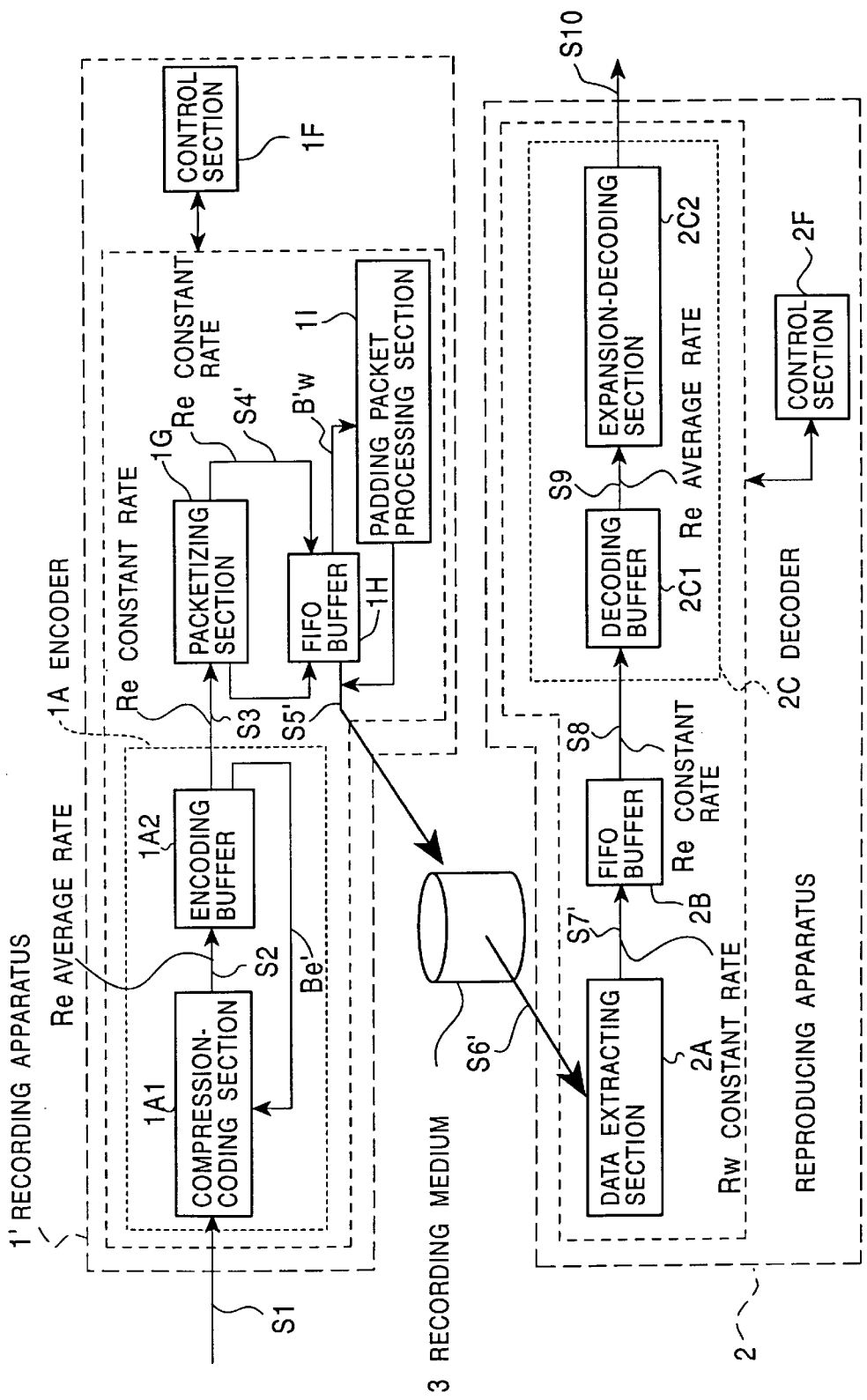
FIG. 6 a block diagram showing the basic construction of a data recording apparatus and of a data reproducing apparatus according to another embodiment of the present invention.

FIG. 6 shows a hardware construction example of a recording apparatus 1' for executing the recording method and a reproducing apparatus 2' for executing the reading method. In the following description, the components which are the same as those in the above-described embodiment will be indicated by the same reference numerals.

First, the construction of the recording apparatus 1' will be described. The recording apparatus 1' is composed of an encoder 1A, a packetizing section 1G, an FIFO buffer memory 1H, and a padding packet processing section 1I.

The encoder 1A is composed of a compression coding section 1A1 and an encoding buffer memory 1A2. The compression coding section 1A1 effects variable-amount compression coding of a moving picture signal S1 at an average rate of Re, and successively outputs coded data S2 to the encoding buffer memory 1A2 having a capacity Be.

Further, when a fixed amount of coded data S2 has been accumulated in the memory, the encoding buffer memory 1A2 outputs coded data S2 at the rate Re. The buffer remainder Be' of the encoding buffer memory 1A2 is fed back to the compression coding section 1A1 so that the buffer may not suffer failure.

The packetizing section 1G successively inputs items of coded data S3 output from the encoder 1A and stores them in one or a plurality of packets before outputting them. In this process, the packetizing section 1G writes the requisite information, such as the packet size, the kind of data and the time information, to the packet header, and outputs it to the FIFO buffer memory 1H at a fixed rate Re which is the same as the encoding rate.

The FIFO buffer memory 1H is a buffer memory with a capacity Bw provided for data rate conversion. The FIFO buffer memory 1H accumulates the coded data S4' written at the rate Re for a predetermined period of time Tw. After that, it reads the data at a reading rate Rw higher than the writing rate Re and records it on the recording medium 3.

As a result, packet data S5' can be written without fail to the recording medium 3 within a period of time corresponding to the clip reproduction time T regardless of the amount of information generated at the time of encoding.

Here, the accumulation time Tw, the reading rate Rw and the buffer capacity Bw of the FIFO buffer memory 1H at the time of this reading operation are calculated as follows:

$$Tw \geq (Re \times T + Be)/Re - T = Be/Re \qquad (9)$$

$$Rw \geq (Re \times T + Be)/T = Re + Be/T \qquad (10)$$

$$Bw \geq Tw \times Re + \text{total number of bytes of packet header} \qquad (11)$$

Due to the relation ship: Rw>Re, it is possible for the FIFO buffer memory 1H to run out of data during the data writing to the recording medium 3. In view of this, the padding packet processing section 1I is provided.

The padding packet processing section 1I or the control section 1F constantly detects the buffer remainder B'w of the FIFO buffer memory 1H. When the buffer remainder B'w has become zero, the padding packet processing section 1I outputs a meaningless packet that is not directly related to the data (i.e., padding packet) for the purpose of filling the blank period, whereby failure in data transmission form is prevented. The encoder 1A, the packetizing section 1G, the FIFO buffer 1H, and the padding packet processing section 1I are controlled by the control section 1F.

Next, the construction of the reproducing apparatus 2' will be described. The reproducing apparatus 2' is composed of a data extracting section 2A, an FIFO buffer memory 2B and a decoder 2C.

The reproducing apparatus 2' reads out recording data recorded on the recording medium 3 at a fixed rate Rw, and reads it to the data extracting section 2A as reproduction data S'6.

The data extracting section 2A removes the padding packet from the reproduction data S'6 read out and scraps it, and extracts only the encoding data S'7 corresponding to the moving picture signal and transmits it to the FIFO buffer memory 2B for reading.

Assuming that the reading rate at which the data extracting section 2A reads the recording data S'6 from the recording medium 3 is the same as the writing rate, i.e., Rw, the requisite time for reading Td can always be kept within the clip display time as shown by the following formula:

$$Td = (Re \times T + Be)/Rw \leq T \qquad (12)$$

In this way, the coded data S'7 extracted by the data extracting section 2A is written to the FIFO buffer memory 2B for reading, and the data rate is restored to the original value. The capacity Br of the FIFO buffer memory 2B satisfies the following condition:

Generally speaking, the capacity of the decoding buffer memory 2C1 contained in the decoder 2C is not smaller than that of the encoding buffer memory 1A2, so that, in this embodiment, the capacity Br of the FIFO buffer memory 2B is the same or larger than the capacity Bw of the FIFO buffer memory 1H for writing, as shown by the following inequality:

$$Br \geq Bw \qquad (13)$$

(3-2) Procedures For Recording And Reproduction

Recording and reproducing operations executed in the recording apparatus 1' and the reproducing apparatus 2' of the above construction at the time of recording and reproduction will be described one by one.

Figure 7:
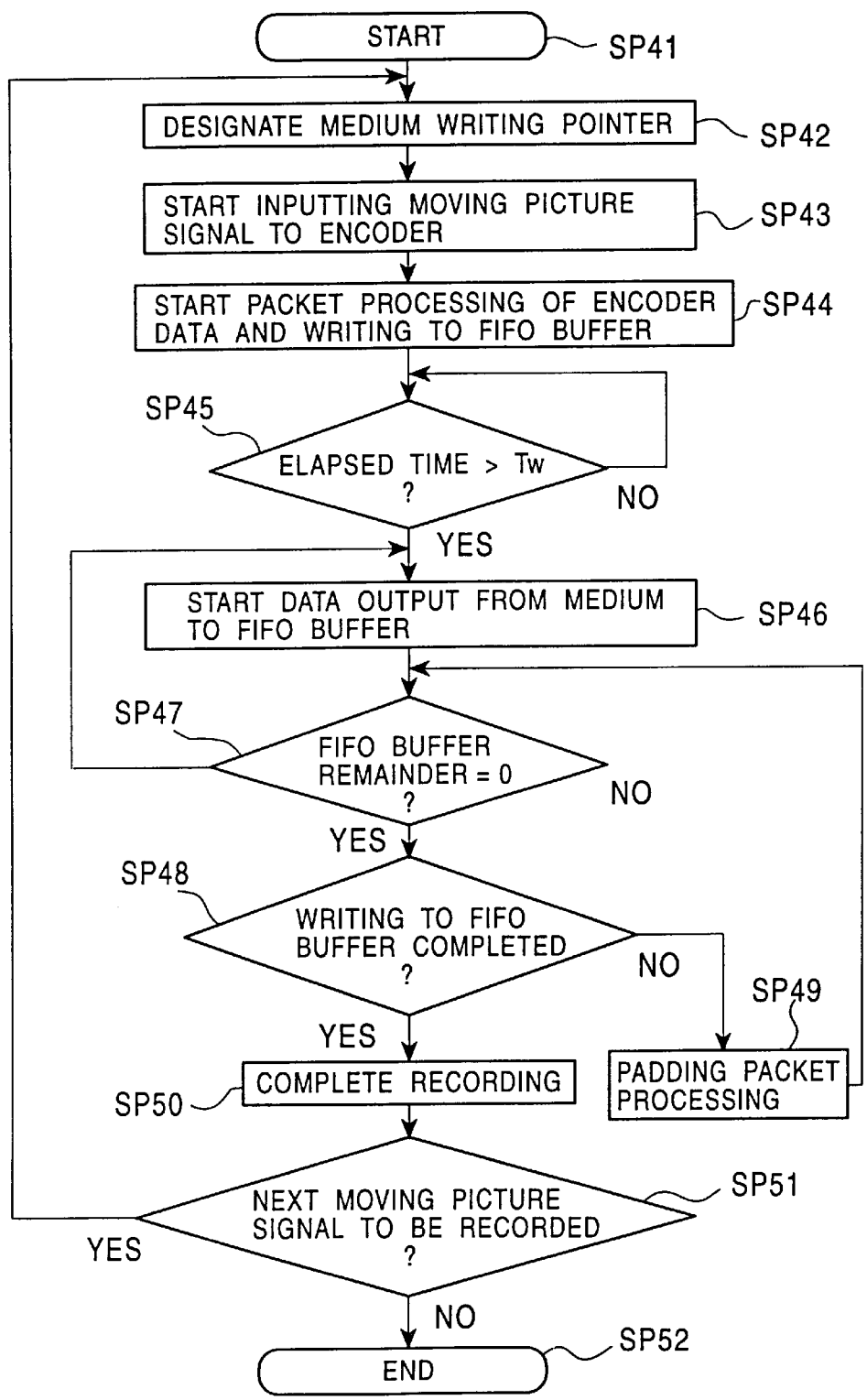
FIG. 7 is a flowchart illustrating a recording operation by the data recording apparatus.

First, the recording operation when a plurality of clips are to be continuously reproduced without interruption, that is, the control operation of the control section 1F, will be described with reference to FIG. 7.

When the recording operation is started, the procedure for the recording apparatus 1' advances from step SP 41 to step SP 42, and designates the position for the recording of the moving picture signal on the recording medium 3 by means of a writing pointer. This pointer also is used as the reading pointer for reading out the recording data of the moving picture signal at the time of reproduction.

When the designation with the writing pointer has been completed, the procedure for the recording apparatus 1' advances to step SP 43, in which the moving picture signal S1 is input to the encoder 1A, and variable amount encoding is started.

When the encoding is started, the recording apparatus 1' encodes the moving picture signal S1 by the encoder 1A at the average rate Re and, as shown in step SP 44, successively packetizes the coded data S3 obtained by the encoding. At the same time, the recording apparatus 1' starts to write the packetized packet data S4 to the FIFO buffer memory 1H.

As shown in the next step SP 45, the recording apparatus 1' checks the period of time elapsed from the writing start time and makes a judgment as to whether the period of time elapsed is larger than the accumulation time Tw as given by formula (4).

When the result of the judgment is in the affirmative, the recording apparatus 1' starts the reading of the packet data S'5 from the FIFO buffer memory 1H, as shown in step SP 46. The data rate Rw in this reading is, as described above, a value larger than the data rate Re when the data is written to the FIFO buffer memory 1H.

After this, as shown in step SP 47, the recording apparatus 1' returns from step SP 47 to step SP 46 until it is made sure that the remainder B' of the FIFO buffer memory 1H has become zero, and continues to write the packet data S'5 read from the FIFO buffer memory 1H to the recording medium 3.

When the result of step SP 47 is in the affirmative and it is made sure that the FIFO buffer memory 1H has become empty, the procedure for the recording apparatus 1' advances to step SP 48, in which a judgment is made as to whether the writing of the packet data S4 to the FIFO buffer memory 1H has been completed or not.

When the result of the judgment is in the negative, it is determined in the recording apparatus 1' that the FIFO buffer memory 1H has become temporarily empty due to the fact that the reading rate Rw is higher than the writing rate Re and the procedure advances to step SP 48, where the shortage in packet data is compensated for by filling with padding packet.

After this, the procedure for the recording apparatus 1' returns to step SP 47, in which a judgment is made again as to whether the buffer remainder B' is zero or not. If it is not zero, the writing to the recording medium 3 is started again. When it is zero, a judgment is made in step SP 48 as to whether the writing to the FIFO buffer memory 1H has been completed or not.

When the result obtained in step SP 48 is in the affirmative, the completion of the recording of a series of moving picture signals S1 is confirmed in step SP 50, and in the next step SP 51, a judgment is made as to whether the moving picture signal S1 of the next clip is to be recorded or not.

As long as the result of the judgment is in the affirmative, the recording apparatus 1' repeatedly executes the procedures of steps SP 42 through SP 51. When the result obtained is in the negative, the recording of a plurality of clips is completed.

The reproducing operation effected when reproducing the thus recorded recording data from the recording medium 3 is basically the same as that in the above-described embodiment. In this embodiment, the padding packet is removed from the reproduction data S'6 in step SP 24.

Figure 8:
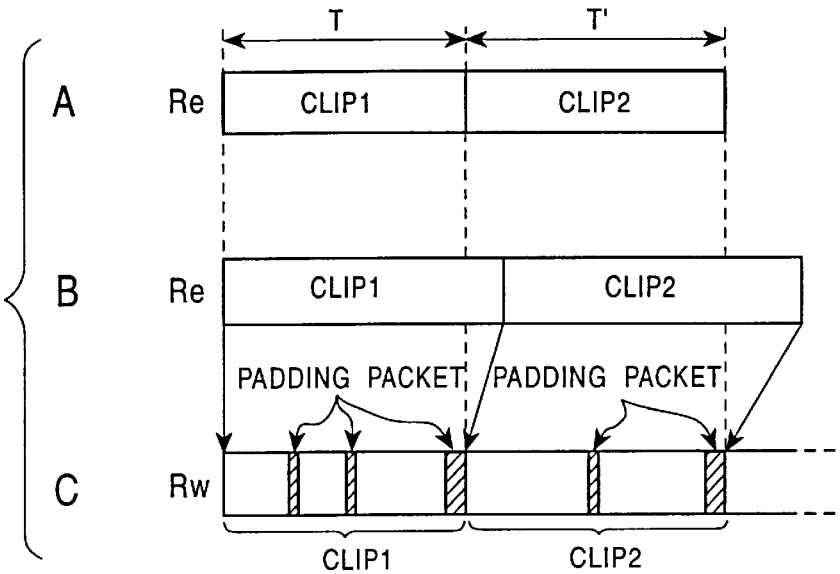
FIG. 8 is a schematic diagram showing the relationship between data generation amount and processing time in recording.
Figure 9:
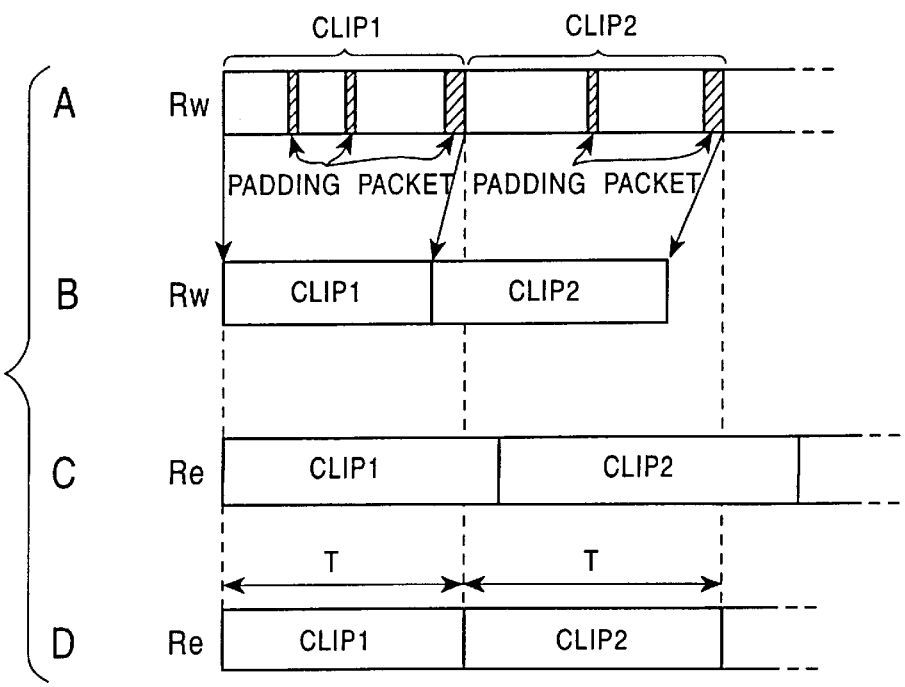
FIG. 9 is a schematic diagram showing the relationship between data generation amount and processing time in reproduction.

FIGS. 8 and 9 show the relationship between data amount and processing time in an example of recording/reproducing operation in which two clips, clip 1 and clip 2, are continuously recorded.

It will be assumed that the image periods of the clip 1 and clip 2, which are to be recorded continuously, are T and T', as shown in FIG. 8(A). Generally speaking, it is possible for the amount of coded data generated in the encoder 1A to fluctuate by an amount corresponding to the capacity Be of the encoding buffer memory 1A2 of the encoder 1A. For example, assuming that the amount of coded data is large, it takes T+ΔT and T'+ΔT' to read the coded data S3 of clip 1 and clip 2 from the FIFO buffer memory 1H, as shown in FIG. 8(B).

If this coded data S3 were recorded as it is on the recording medium 3 as in the prior art, it would take T+ΔT and T'+ΔT' to reproduce clip 1 and clip 2 from the recording medium 3, which would be longer than the display time. Thus, in conventional reproducing apparatus, there is a fear of a blank time ΔT being generated if two clips, clip 1 and clip 2, are continuously reproduced.

In the recording apparatus 1' of this embodiment, in contrast, data is read from the FIFO buffer memory 1H at a data rate higher than the average encoding rate Re and in a condition satisfying formula (5), so that the data portions including clip 1 and clip 2 can be completely written to the recording medium 3 within the image periods T and T' regardless of the buffer remainder Be'. This is shown in FIG. 8(C). The shaded portions in the drawing represent the padding packet filling periods.

At the time of completion of the recording on the recording medium, data is recorded on the recording medium 3 in a data construction as shown in FIG. 8(C).

In reproduction, the reproducing apparatus 2' can read the recording data of the moving picture signals corresponding to clip 1 and clip 2 within the periods T and T', respectively, as shown in FIG. 9(A).

Furthermore, data unrelated to the coded data, such as padding packet, is extracted from the reproduction data S6 read out, so that, as shown in FIG. 9(B), only the data really corresponding to the moving picture signals is read to the FIFO buffer memory 2B.

After this, coded data S8 is read out, as shown in FIG. 9(C), from the FIFO buffer memory 2B to the decoder 2C at the original data rate Re and decoded. At this time, in FIG. 9(C), the apparent data reading periods are longer than the display periods of clip 1 and clip 2 by an amount corresponding to the buffer remainder. However, since the decoding operation for each item of coded data is completed in periods T and T', respectively, it is possible to continuously reproduce two clips, clip 1 and clip 2, as shown in FIG. 9(D).

(4) Application System

Next, a system construction example to which this basic system is applied will be described. Here, the recording apparatus 1 will be described with reference to an integral-type system in which the recording medium 3 and the reproducing apparatus 2 are connected through a communication channel and to with reference to a separation type system in which there is a connection through cable between the recording apparatus 1 and the recording medium 3 or between the recording medium 3 and the reproducing apparatus 2.

(4-1) Integral-Type System

Figure 10:
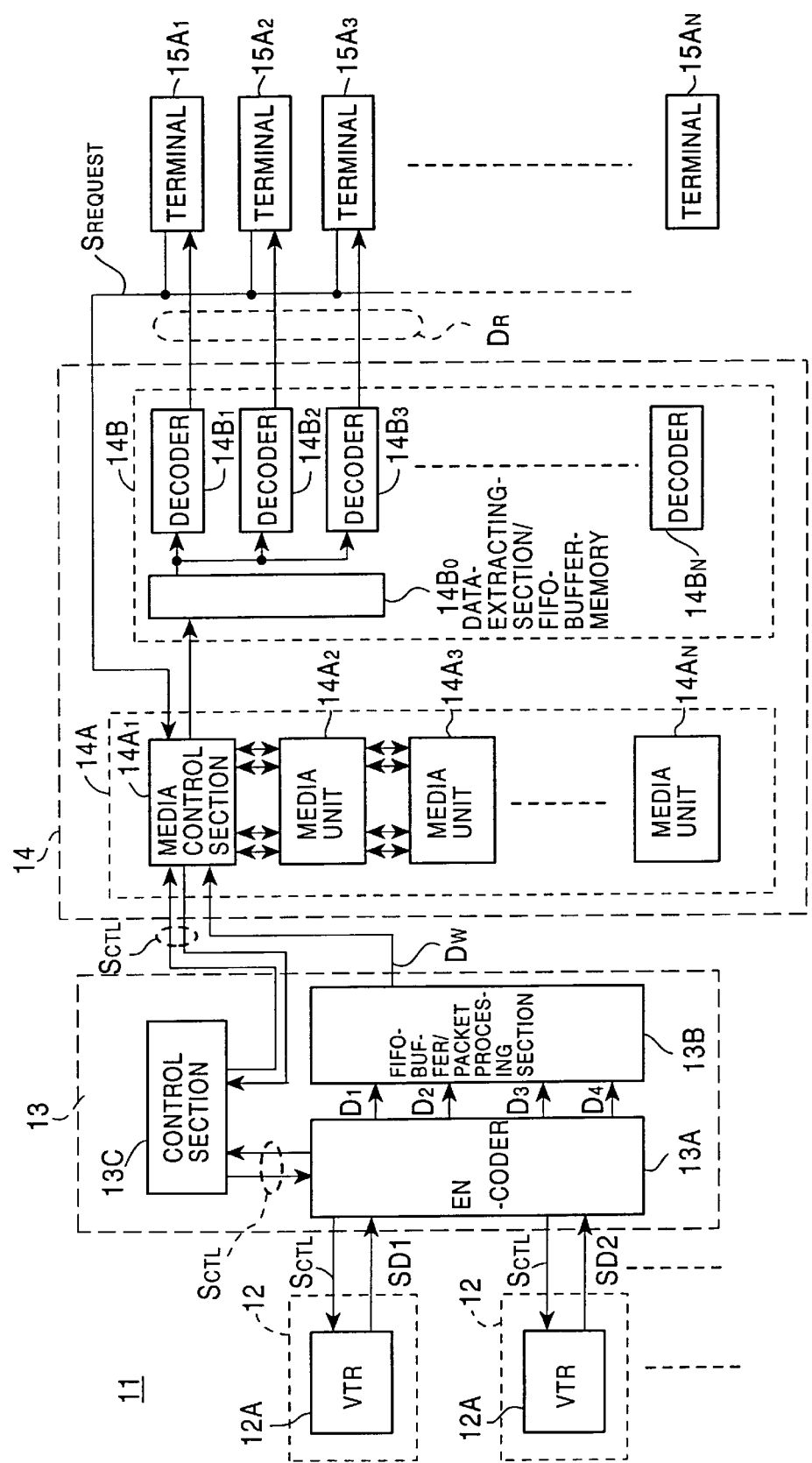
FIG. 10 is a block diagram showing an example of the construction of an AV server system.

Here, as an example of the integral-type system, a server system in which AV signals (audio and video signals) are distributed to a number of terminal devices through a communication circuit (hereinafter referred to as an "AV server system") will be described. FIG. 10 shows the overall construction of an AV server system 11.

This AV server system 11 is composed of a data supply source 12, an encoding section 13 and a server section 14. The system is used to distribute AV signals from the server section 14 to a number of terminals 15A1 through 15AN. Each section is constructed as described below.

The data supply source 12 consists of reproducing apparatuses 12A, such as video tape recorders (VTR) or magneto-optical disks. Each reproducing apparatus 12A supplies AV data signals SD1, SD2, ... to the encoding section 13 through a transmission line or a signal line. In this example, a plurality of data supply sources 12 are provided.

The encoding section 13 is a section corresponding to the recording apparatus 1 of the basic system, and is composed of an encoder 13A, an FIFO-buffer/packet-processing section 13B and a control section 13C. of these, the encoder 13A encodes the AV data signals SD1, SD2, ... input from the data supply sources 12 into signals of a data format in conformity with the MPEG 2 standards, converting them to data streams D1, D2, . . . .

The FIFO-buffer/packet-processing section 13B stores these data streams D1, D2 ... temporarily in the FIFO buffer memory for rate conversion, and the rate-converted coded data is converted to packet data Dw in the packet processing section.

The control section 13C controls the data supply source 12, the encoder 13A and the server section 14 by a control signal $S_{CTL}$, and manages the operating condition of each section.

The server 14 is composed of a recording/reproducing section 14A and a decoding section 14B. The recording/reproducing section 14A records coded data obtained by further compressing compression-coded data supplied from the encoding section 13 in time-axis direction on the recording medium, and, when there is an instruction from the user, reads corresponding coded data to output it to the decoding section 14B. The instruction from the user is input as a request signal $S_{request}$.

The recording/reproducing section 14A is composed of a media control section 14A1 and a plurality of media units 14A2 through 14A8. Here, the media control section 14A1 is a unit for controlling the recording/reproducing operations of the plurality of media units 14A2 through 14A8. Further, each of plurality of media units 14A2 through 14A8 contains a plurality of hard disks so that they can record and reproduce a plurality of signals simultaneously and in parallel, whereby multi-access from a number of terminals 15A1 through 15AN can be realized. Further, coded data supplied from the encoding section 13 are recorded on these hard disks as clips.

The decoding section 14B is composed of a data-extracting-section/FIFO-buffer-memory 14B0 and a plurality of decoders 14B1 through 14BM. Here, the number of the decoders 14B1 through 14BM provided in the decoding section 14 is determined by the number of terminals 15A1 through 15AN finally connected and the number of items of coded data that can be simultaneously reproduced by the recording/reproducing section 14A.

The decoding section 14B decodes coded data read out by the decoders 14B1 through 14BM through the media units 14A2 through 14A8 and outputs it to the terminals 15A1 through 15AN.

It is not always necessary for this AV server system 11 to be provided in one room; it also allows connection through LAN (local area network) or the like.

(4-2) Separation-Type System

Figure 11:
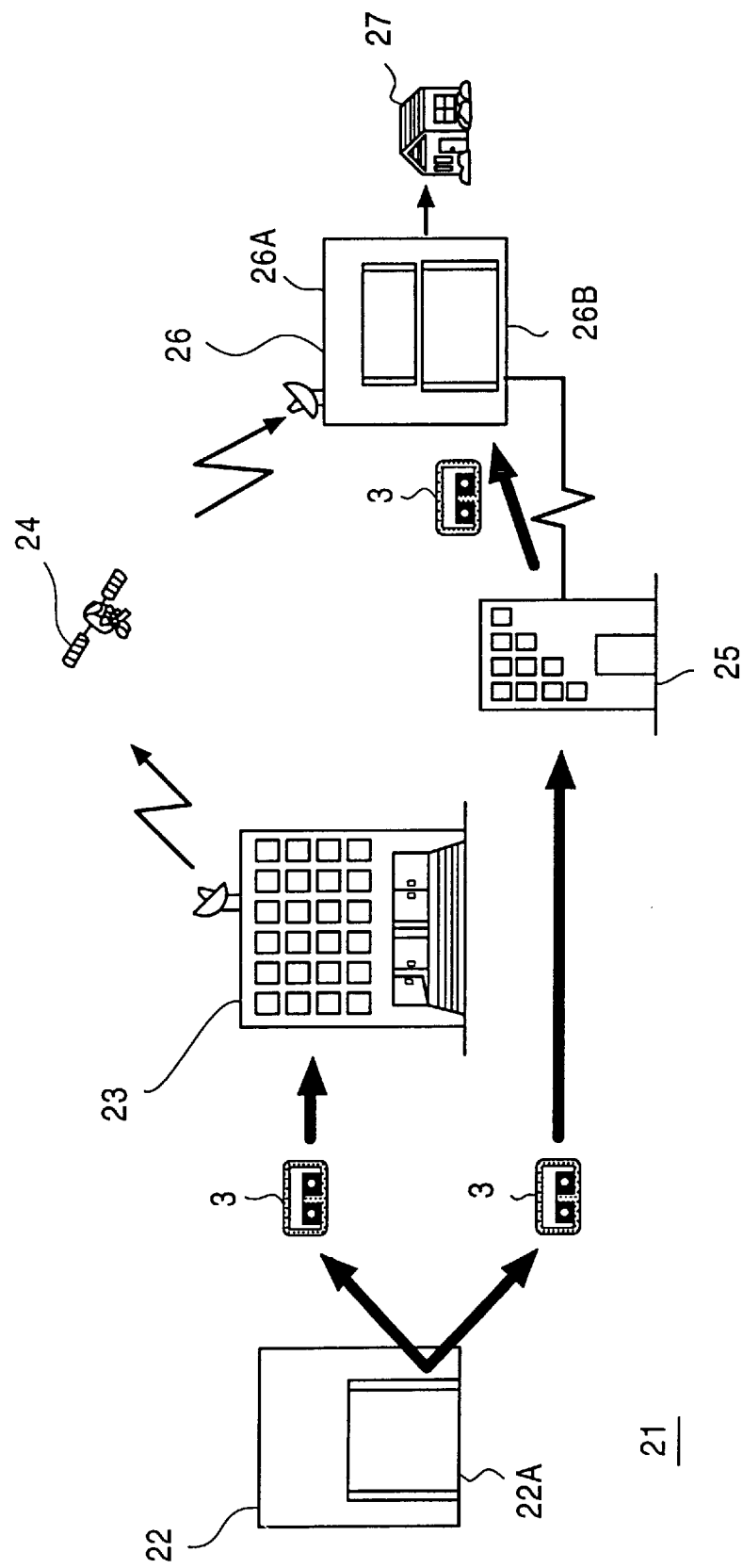
FIG. 11 is a block diagram showing another example of the construction of an AV server system.

Next, as an example of the separation-type system, an AV server system, which distributes AV signals (audio and video signals) to a number of terminal devices through physical delivery of a recording medium, will be described. FIG. 11 shows the construction of an AV server system 21.

This AV server system 21 is a system composed of a production station 22, a key station 23, an artificial satellite 24, a cable station 25, a branch station 26, a home 27, etc., which are geographically spaced apart from each other.

In this example, the recording apparatus 1 described with reference to the basic system corresponds to an encoder 22A provided in the production station 22, and the reproducing apparatus 2 corresponds to a decoder 26A provided in the branch station 26.

The production station 22 is a producing company or a producing office which edits image source to produce commercials (CM), programs, etc. The moving picture of a program or a CM is compression-coded here and recorded on the recording medium 3. The recording medium 3 is physically delivered to the key station 23, the cable station 25, etc.

The key station 23 is used when image data reproduced from the recording medium 3 is transmitted to the artificial satellite 24 in the form of compression-coded data and transferred to the branch station 26, which is at a remote site. This data transfer may be regarded as a radio transfer between the recording medium 3 and the reproducing apparatus 2 in the basic system.

The cable station 25 is used when image data reproduced from the recording medium 3 is transmitted in the form of compression-coded data to the branch station 26, which is at a remote site, through a cable. Apart from this, data transmission between the cable station 25 and the branch station 26 can also be effected through physical delivery of the recording medium 3.

The branch station 26 is provided with a decoder 26A and a file server 26B and is used when decoding received coded data at the original data rate and transmitting it to the home 27 as a moving picture signal.

The basic system allows such an application, too. Further, while in this example the encoder 22 is provided in the production station 22, it is also possible for the encoder to be provided in the key station 23.

Further, while in this example the decoder 26A is provided in the branch station 26, it is also possible to realize an example in which the decoder is provided in each home 27.

(5) Still Another Embodiment

While in the above-described embodiment the encoder 1A, the FIFO buffer memory 1B, the packetizing section 1C and the stuffing section 1D (or the padding packet processing section 1I) are united as the recording apparatus 1, the present invention is not restricted to this construction. It is also possible for these components to be contained in separate casings.

Similarly, while in the above-described embodiment the data extracting section 2A, the FIFO buffer memory 2B, and the decoder 2C are united as the reproducing apparatus 2, the present invention is not restricted to this construction. It is also possible for these components to be contained in separate casings.

Further, while in the above-described embodiment a hard disk, a video tape or the like is used as the recording medium 3, this should not be construed restrictively. The present invention is also applicable to other recording media. For example, it is also applicable to an optical disk or a so-called optical card, such as a video disk, a magneto-optical disk or a phase change type disk. Further, it is also applicable to a magnetic recording medium, such as a floppy disk.

Further, while in the above-described embodiment the reading of data from the recording medium 3 is effected at the rate Rw which is the same as the rate at which the writing of data to the recording medium is effected, the reading rate may be higher than this.

When compression-coding a moving picture signal, the amount of data generated usually fluctuates. However, as described above, in accordance with the present invention, conversion of data to packet data of a fixed size has been effected when the data is recorded on a recording medium or when it is output to a transmission line, so that, in spite of this fluctuation, it is possible to complete the recording or transmission of a moving picture signal within a fixed period of time regardless of the amount of data generated, whereby it is always possible, in reproduction or reception, to reproduce or receive a moving picture signal within a fixed period of time regardless of the amount of data generated, making it possible to continuously reproduce expansion-decoded moving picture signals.

What is claimed is:

1. A data transmission method in which data obtained by compression-coding a moving picture signal of a fixed period of time T into compression coded data is transmitted through a transmission line, comprising the steps of:

writing the compression-coded data to a first buffer memory and inhibiting data output to the transmission line for a fixed period of time Tw from the input start of the compression-coded data to the first buffer memory;

after the fixed period of time Tw has elapsed, continuing the writing of the compression-coded data to the first buffer memory and reading out the compression-coded data written to the first buffer memory at a data rate Rw which is not lower than the data rate Re of the writing to the first buffer memory, wherein the fixed period of time Tw is set to be a value (Be/Re) which is not smaller than the value of the minimum requisite time for reading an amount of data corresponding to the total capacity (Be) of a second buffer memory provided in an encoding section for encoding the moving picture signal into compression-coded data and outputting said compression-coded data from said second buffer memory and according to the equation:

$$Rw >= (Re \times T + Be)/T = Re + Be/T;$$

packetizing the read compression-coded data of a fixed size; and outputting the packetized data to the transmission line.

2. A data transmission apparatus comprising:

an encoding section for compression-coding a moving picture signal of a fixed period of time T into compression-coded data and outputting the compression-coded data;

a first buffer memory to which said compression-coded data is input from the encoding section and which, for a fixed period of time Tw from the input start of the compression-coded data to the first buffer memory, only allows the writing of the compression-coded data and inhibits outputting the compression-coded data that has been written and, after the fixed period of time Tw has elapsed, reads the compression-coded data that has been written at a data rate Rw which is not lower than the data rate Re for the writing while continuing the writing of the compression-coded data, wherein the fixed period of time Tw is set to be a value (Be/Re) which is not smaller than the value of the minimum requisite time for reading from a second buffer Provided in the encoding section an amount of data corresponding to the total capacity (Be) of said second buffer memory and according to the equation:

$$Rw >= (Re \times T + Be)/T = Re + Be/T;$$

and a packetizing section for packetizing the packetized compression-coded data read from the first buffer memory and outputting the compression-coded data to a transmission line always as packet data of a fixed size.

3. A data transmission method in which compression-coded data that is obtained by compression-coding a moving picture signal of a fixed period of time T and is accumulated in a first encoding buffer memory for a fixed period of time Tw from the input start of the compression-coded data into the first encoding buffer memory and, after the fixed period of time Tw has elapsed, while the writing of the compression-coded data into the first encoding buffer memory is being continued, the compression-coded data is read from the first encoding buffer memory at a rate Rw higher than the writing rate Re to packetize the compression-coded data to thereby obtain packet data, which is received through a transmission line, wherein the fixed Period of time Tw is set to be a value (Be/Re) which is not smaller than the value of the minimum requisite time for reading an amount of data corresponding to the total capacity (Be) of a second encoding buffer memory provided in an encoding section for encoding the moving picture signal into compression-coded data and outputting said compression-coded data from said second encoding buffer memory and according to the equation:

$$Rw >= (Re \times T + Be)/T = Re + Be/T,$$

the data transmission method comprising the steps of:

reading the packet data from the transmission line at a data rate not lower than the data rate at which the packet data was output to a transmission line;

writing the read out packet data to a second decoding buffer memory;

reading out the packet data written to the decoding buffer memory at a data rate which is substantially the same as the data rate of writing the compression-coded data to the first encoding buffer memory; and transmitting the packet data.

4. A data transmission apparatus comprising:

a data extracting section that outputs extracted compression-coded data that is obtained by compression-coding a moving picture signal of a fixed period of time T and is accumulated in a first encoding buffer memory for a fixed period of time Tw from the start of the input of the compression-coded data into the first encoding buffer memory and, after the fixed period of time Tw has elapsed, while the writing to the first encoding buffer memory is being continued, the compression-coded data is read from the first encoding buffer memory at a rate Rw higher than the writing rate Re of the compression-coded data into the first encoding buffer memory to packetize the compression-coded data to thereby obtain packet data, which is received through a transmission line, the compression-coded data received through the transmission line at the rate Rw being extracted from the packet data wherein the fixed period of time Tw is set to be a value (Be/Re) which is not smaller than the value of the minimum requisite time for reading an amount of data corresponding to the total capacity (Be) of a second encoding buffer memory provided in an encoding section for encoding the moving Picture signal into compression-coded data and outputting said compression-coded data from said second encoding buffer memory and according to the equation:

$$Rw >= (Re \times T + Be)/T = Re + Be/T;$$

a second decoding buffer memory to which the compression-coded data is sequentially input and written from the data extracting section, wherein, after the writing, the compression-coded data is read out from the decoding buffer memory at a data rate which is lower than the data rate at which the compression-coded data is read from the data extracting section and which is substantially the same as the data rate at which the compression coding is effected; and a decoding section for decoding the compression-coded data read from the second decoding buffer memory to obtain the moving picture signal.

5. A data transmission method in which data obtained by compression-coding of a moving picture signal of a fixed period of time T is transmitted through a transmission line, comprising the steps of:

packetizing compression-coded data output from an encoding section into packet data of a fixed size;

writing the packet data to a first buffer memory and inhibiting data output to the transmission line for a fixed period of time Tw from the output start of the packet data, wherein the fixed period of time Tw is set to be a value (Be/Re) which is not smaller than the value of the minimum requisite time for reading an amount of data corresponding to the total capacity (Be) of a second buffer memory provided in the encoding section for encoding the moving picture signal into compression-coded data and outputting said compression-coded data from said second buffer memory and according to the equation:

$$Rw \geq (Re \times T + Be)/T = Re + Be/T;$$

after the fixed period of time Tw has elapsed, continuing writing of the packet data to the first buffer memory; and, reading out the packet data that has been written to the first buffer memory at a data rate Rw which is not lower than the data rate Re of the writing of the packet data to the first buffer memory to transmit the packet data to the transmission line.

6. A data transmission apparatus comprising:

an encoding section for compression-coding a moving picture signal of a fixed period of time T into compression-coded data and outputting the compression-coded data;

a packetizing section to which the compression-coded data is input from the encoding section read from the first buffer memory and in which the compression-coded data is packetized into packet data and is output as packet data;

a first buffer memory to which the packet data is input from the packetizing section and which, for a fixed period of time Tw from the input start of the packet data, only allows the writing of the packet data and inhibits the outputting thereof and, after the fixed period of time Tw has elapsed, reads the packet data that has been written at a data rate Rw which is not lower than the data rate Re for the writing while continuing the input of the packet data wherein the fixed period of time Tw is set to be a value (Be/Re) which is not smaller than the value of the minimum requisite time for reading from a second buffer memory provided in the encoding section an amount of data corresponding to the total capacity (Be) of said second buffer memory and according to the equation:

$$Rw \geq (Re \times T + Be)/T = Re + Be/T;$$

and transmission means for transmitting said packet data.

7. A data transmission method in which packet data that is obtained by packetizing compression-coded data obtained by compression-coding a moving picture signal of a fixed period of time T is accumulated in a first encoding buffer memory for a fixed period of time Tw from the input start of the packet data into the first buffer memory, wherein the fixed period of time Tw is set to be a value (Be/Re) which is not smaller than the value of the minimum requisite time for reading an amount of data corresponding to the total capacity (Be) of a second encoding buffer memory provided in an encoding section for encoding the moving picture signal into compression-coded data and outputting said compression-coded data from said second buffer memory and according to the equation:

$$Rw \geq (Re \times T + Be)/T = Re + Be/T,$$

and, after the fixed period of time Tw has elapsed, while the writing of the packet data to the first encoding buffer memory is being continued, the packet data is read at a rate Rw higher than the writing rate Re and recorded on a recording medium and read therefrom, the transmission method comprising the steps of:

reading out the packet data from the recording medium at a data rate not lower than the data rate at which the packet data was written to the recording medium;

writing the read out packet data to a decoding buffer memory;

reading out the packet data written to the decoding buffer memory at a data rate which is substantially the same as the data rate for the packetizing;

decoding the packet data read out of the decoding buffer memory: and transmitting said packet data.

8. A data transmission apparatus comprising:

a data extracting section in which packet data that is obtained by packetizing compression-coded data obtained by compression-coding a moving picture signal of a fixed period of time T is accumulated in a first encoding buffer memory for a fixed period of time Tw from the start of the input of the compression-coded data to the first encoding buffer memory, wherein the fixed period of time Tw is set to be a value (Be/Re) which is not smaller than the value of the minimum requisite time for reading an amount of data corresponding to the total capacity (Be) of the second encoding buffer memory provided in an encoding section for encoding the moving picture signal into compression-coded data and outputting said compression-coded data from said second encoding buffer memory and according to the equation:

$$Rw \geq (Re \times T + Be)/T = Re + Be/T,$$

and, after the fixed period of time Tw has elapsed, while the writing of the packet data to the first encoding buffer memory is being continued, the packet data is read at a rate Rw higher than the writing rate Re and received from a transmission line for data transmission, the packet data being read from the transmission line at the rate Rw higher than the writing rate Re into the data extracting section to extract the compression-coded data from the packet data;

a decoding buffer memory for writing the compression-coded data from the data extracting section; and a decoding section for decoding the compression-coded data read from the decoding buffer memory to obtain the moving picture signal.

* * * * *